Figure 1:
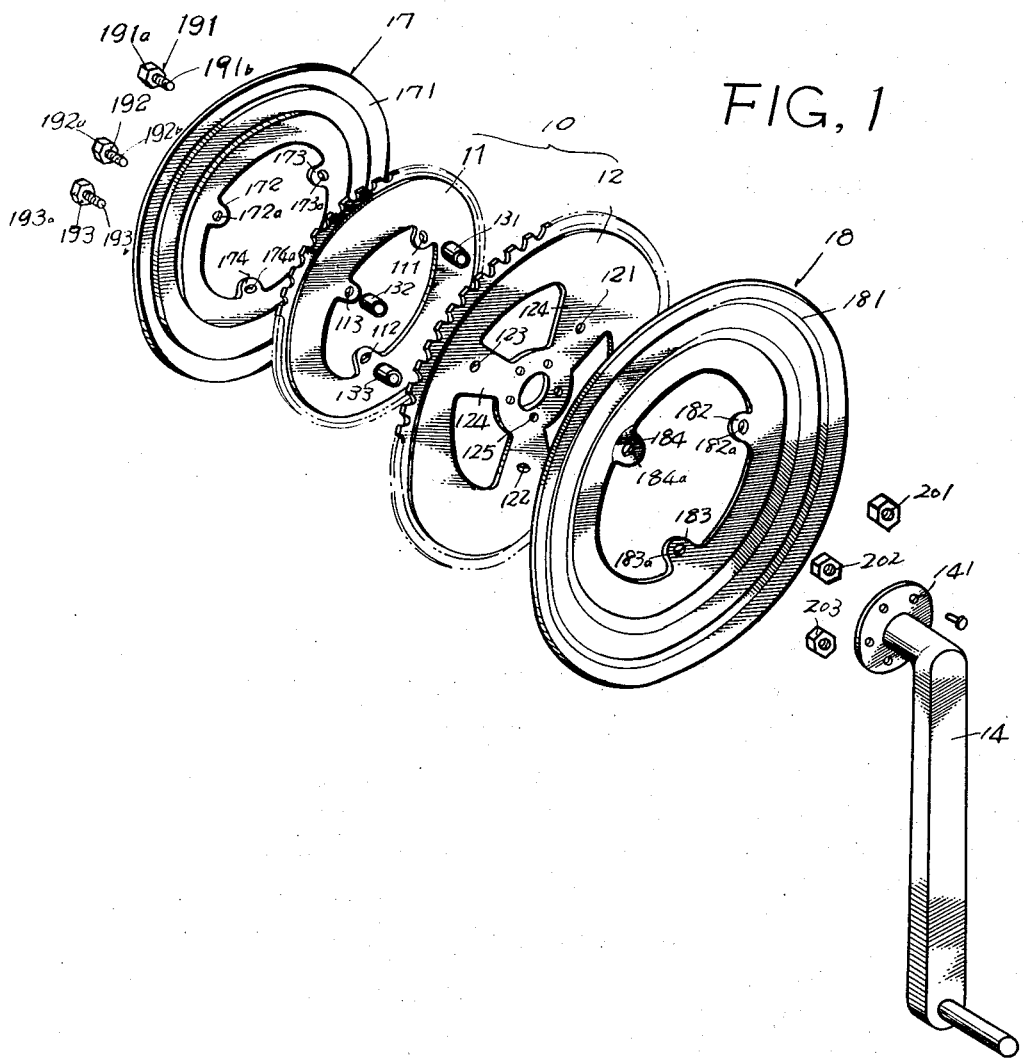

United States Patent [19]

Tarutani

[11] 3,815,439

[45] June 11, 1974

[54] MULTI-SPEED TRANSMISSION FRONT GEAR SYSTEM

[75] Inventor: Satoshi Tarutani, Sakai, Japan

[73] Assignee: Shimano Industrial Co., Ltd., Osaka Prefecture, Japan

[22] Filed: Oct. 20, 1972

[21] Appl. No.: 299,306

[52] U.S. Cl. .............................................. 74/611
[51] Int. Cl. ............................................ F16p 1/00
[58] Field of Search ......................... 74/217 B, 611

[56] References Cited
UNITED STATES PATENTS 3,477,303  11/1969  Brilando ......................... 74/611 X

FOREIGN PATENTS OR APPLICATIONS 444,433  3/1936  Great Britain ................... 74/217 B
567,123  2/1924  France ............................. 74/217 B Primary Examiner—Leonard H. Gerin
Attorney, Agent, or Firm—David Toren

[57] ABSTRACT

In a multi-speed transmission front gear system fixedly mounted to a crank shaft of a bicycle and provided with a plurality of different dent-numbered sprockets rotatable along with said crank shaft, chain guard members are mounted at each side of the minimum dent-numbered lowest speed transmission sprocket and the maximum dent-numbered highest speed transmission sprocket so that a driving chain can be prevented from getting off any selected one of said sprockets when shifted thereto, and further automatically shifted to such a sprocket even though the chain gets off the same.

3 Claims, 3 Drawing Figures

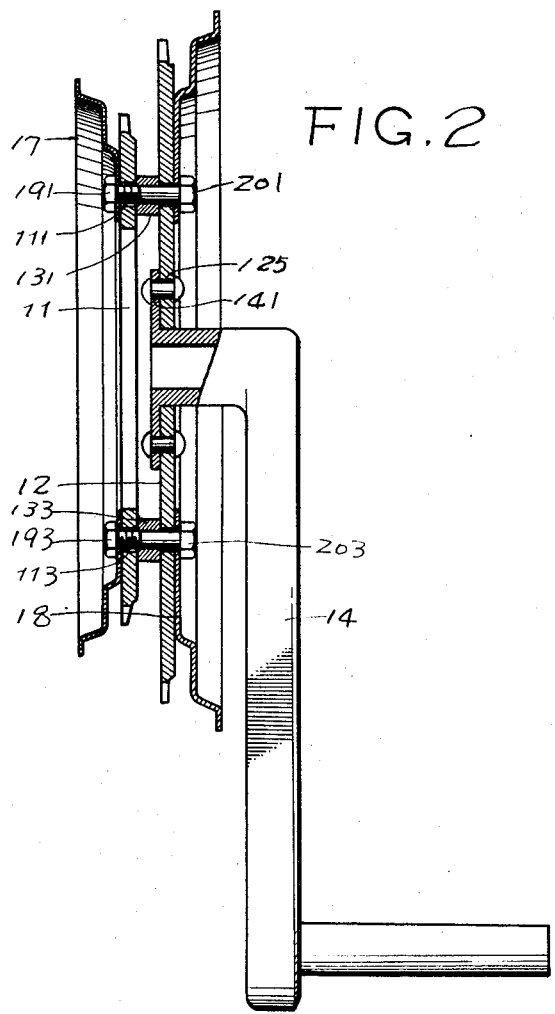

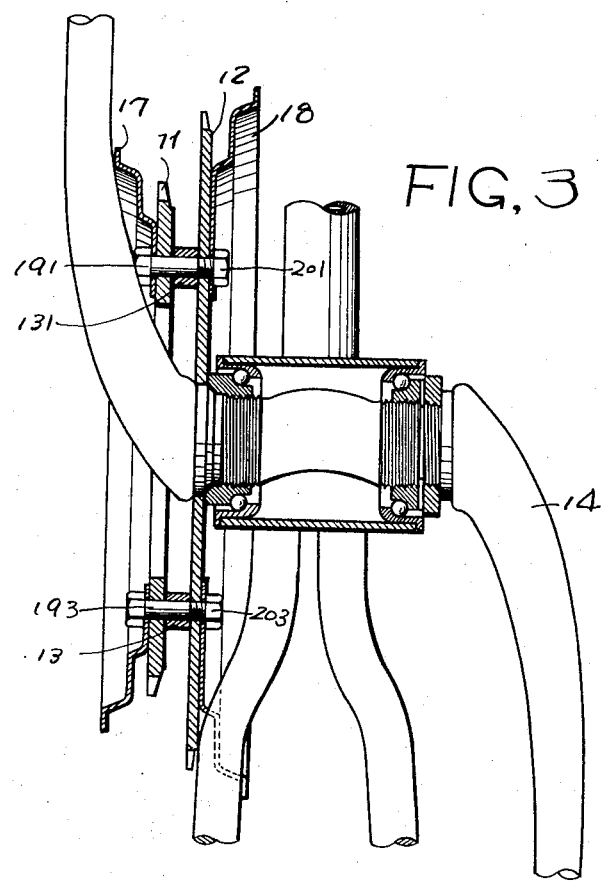

MULTI-SPEED TRANSMISSION FRONT GEAR SYSTEM

The present invention relates generally to a multi-speed transmission front gear system adapted to be fixedly mounted on a crank shaft driven by treading foot-driven pedals of a bicycle, and more particularly it relates to an improved multi-speed transmission front gear system of the type that a plurality of regularly spaced sprockets provided in their respective periphery with a different number of dents are rigidly mounted in juxtaposed relation with each other on the crank shaft so as to enable a cyclist to engage a driving chain with any selected one of the sprockets by operating a separate gear-shifting system thereby to rotate a bicycle rear wheel at a desired speed change rate by means of driving force transmitted thereto from the selected sprocket that rotates along with the rotation of the crank shaft driven by pedalling.

Hitherto it has been well known in the art to secure a desired running speed rate of a bicycle by the provision of a front gear system which comprises a plurality of different dent-numbered sprockets so adapted that a driving chain can be engaged with any selected one thereof by means of an independently mounted gear-shifting system.

In this case, however, it is difficult to exactly control the movement of a driving chain even if the gear-shifting system can be operated to shift the chain from one sprocket to another; thus the result is that when the chain is shifted to engage with the outermost highest or lowest speed transmission sprocket, it often takes place that the shifted chain easily runs over the sprocket and is caught into the outside thereof.

Furthermore, in case the gear-shifting system is manipulated violently in a hurry, the driving chain will easily get off a desired sprocket to be engaged with.

When the driving chain runs over the desired sprocket, a cyclist is not able to continue riding a bicycle nor able to keep balance because the load on the pedals is suddenly deadened, consequently giving rise to a jeopardy that he will fall down from the bicycle.

Accordingly, in order to effect the smooth movement of a driving chain from one sprocket to another, it is necessary to utilize such a gear-shifting system that it can shift the chain slowly and exactly by providing the system with a particular adjusting stopper means for adjustably limiting the range within which the chain can move, said stopper means being previously adjusted so as to normally control the range of the driving chain movement.

However, according to the above-mentioned system, it requires much time and labor to providently adjust the range of said chain movement by using the aforesaid adjusting stopper means and, in addition, it often happens to a cyclist that he forgets the adjusting operation of the range so that the driving chain easily gets off a desired sprocket even if he tries to shift the chain thereonto.

Moreover, the gear-shifting system will become complicated in structure and expensive in the cost of manufacture provided that the above-mentioned adjusting stopper means is mounted on the system.

In the meanwhile, there has been proposed such a mechanism that a chain guard is provided on the side of the highest speed transmission sprocket so as to prevent the chain from getting off the sprocket. In this case, however, the chain will get off the lowest speed transmission sprocket to be caught between said sprocket and a chain stay mounted opposedly thereto so that the movement of the chain on the rotation of a crank shaft supporting the front gear is abruptly brought to a halt and causes a cyclist to tumble over the pedals and fall down.

Accordingly, the present invention has been designed to eliminate all the above-mentioned drawbacks and disadvantages and has as one of its main objects the provision of a multi-speed transmission front gear system so adapted that when a driving chain engaged with a sprocket can be shifted therefrom and brought into engagement with any other selected outermost highest or lowest speed transmission sprocket, the chain can be prevented from running thereover to be caught into the outside thereof.

It is another object of the invention to provide a multi-speed transmission front gear system so adapted that even if the driving chain gets off a desired sprocket, the chain is automatically induced to be engaged with the sprocket.

It is a further object of the invention to provide a multi-speed transmission front gear system which can either dispense with said adjusting stopper means or operate per se accurately without necessitating the exact adjusting operation of said stopper means. In other words, the present invention is characterized in that chain guard members and fitting means therefor to be described subsequently are provided at one side of the minimum-dent numbered lowest speed transmission sprocket and the maximum dent-numbered highest speed transmission sprocket, respectively, and that a first chain guard member and a second chain guard member each having a larger diameter than that of each of said sprockets are provided on the gear-shifting system of the invention.

These and other objects and advantages of the present invention will become apparent from the following description made with reference to some preferred embodiments of the invention shown by way of example in the accompanying drawings and from the appended claims. In the drawings, FIG. 1 is a partially exploded perspective view of a multi-speed transmission front gear system embodied in accordance with the present invention;

FIG. 2 is a side elevation view thereof shown in an assembled state, with some parts broken away; and FIG. 3 is a vertical sectioned view showing a modification thereof in which some parts are excluded.

Setting forth in detail the present invention with reference to the accompanying drawings, reference numeral 10 generally designates a multi-speed transmission front gear system which comprises a pair of sprockets 11 and 12 each having a different number of dents and is so adapted as to transmit two different speeds to a rear wheel from the system. Namely, the sprocket 11 is substantially less in the number of dents than the sprocket 12 and acts to transmit a higher speed to the rear wheel of a bicycle.

The sprocket 11 has holes 111, 112 and 113 each perforated in its positions equally dividable into three sections in the peripheral directions thereof. Likewise, the sprocket 12 also has holes 121, 122 and 123 each perforated in its positions equally dividable into three sections in the peripheral directions thereof. In said positions of the sprockets 11 and 12 there are mounted three collars 131, 132 and 133 for controlling the space between the sprockets 11 and 12 so as to dispose the same opposedly at a regularly spaced apart interval, sprockets 11 and 12 being connected to one another by means of three shafts 191, 192 and 193 which will be described hereinafter.

The sprocket 12 has a boss 125 supported by means of a plurality of supporting arms 124 extending toward the center of the sprocket 12.

In abutment with a flange portion 142 formed on the edge of a cylinder 141 for connecting a crank shaft (not shown in the drawings) to which there is fixedly mounted a crank 14 of a bicycle, said boss 125 is tightly fixed by means of a bolt 15 and a nut 16. Namely, said multi-speed transmission front gear system 10 comprising the above-mentioned lower speed transmission sprocket 11 and higher speed transmission sprocket 12 is mounted to said crank 14 in a manner to rotate synchronously with the rotation of said crank 14.

Incidentally, said crank 14 comprises a pair of crank members which rotatably support foot-driven pedals in their respective foremost end and are rotatably mounted through said crank shaft to a hunger means (not shown) fixed to a chain stay forming part of a bicycle frame truss. Numeral 143 denotes a shaft for fitting said pedals.

The above-mentioned construction of the gear system 10 is well known in the prior art, and the fixture of the system 10 to said crank 14 or the connection of the sprocket 11 to the sprocket 12 are not always limited to the above-disclosed construction but applicable to such a construction for example as shown in FIG. 3 of the accompanying drawing. To be more precise, what is shown in FIG. 3 is fundamentally not far remote from what are shown in FIGS. 1 and 2 with the exception that a pair of crank members in FIG. 3 are formed integrally with a crank shaft for connecting said crank members.

In FIGS. 1 and 2 a driving mechanism is formed with said said pair of crank members and a single crank shaft, with one of said crank members adapted to mount the multi-speed transmission front gear system 10 as has been mentioned herein above.

FIG. 3 shows the crank 14 integrally formed with said crank members connected to the crank shaft so that the multi-speed transmission front gear system 10 of the invention is mounted to said crank shaft and fixed to the end thereof by means of a stationary cone (not shown in the drawings), being unrotatably fixed to the crank 14 through the projections thereof inserted into holes perforated on the lower speed transmission sprocket 11.

In the present embodiment, the multi-speed transmission front gear system 10 constructed in the above-mentioned manner is provided with a first chain guard member 17 and a second chain guard member 18 respectively mounted at the outside of the lower and higher speed sprockets 11 and 12 forming the system 10 of the invention.

Said first chain guard member 17 mounted at the outside of the lower speed transmission sprocket 11 is substantially greater in diameter than the lower speed transmission sprocket 11 and provided with a chain guard portion 171 and three fitting portions 172, 173 and 174 as clearly shown in FIG. 1.

As is evident in FIG. 2, said chain guard portion 171 comprises an annular portion 171a swollen outwardly therefrom to an extent not exceeding the width of chain links forming a driving chain thereby to correspond to the annular dentation of said lower speed transmission sprocket 11, an annular inclined portion 171b protruded outwardly from the outer peripheral edge of the annular portion 171a at an obtuse angle therewith, and a vertical portion 171c extended outwardly from the outer peripheral edge of said annular inclined portion 171b.

Said three fitting portions 172, 173 and 184 are formed in the inner peripheral edge of said chain guard portion 171, i.e., in such positions that said annular portion 171a can be divided equally into three sections with respect to the inner periphery thereof.

Further these fitting portions 172, 173 and 174 are perforated with holes 172a, 173a and 174a, respectively.

Said second chain guard member 18 mounted at one side of the higher speed transmission sprocket 12 is substantially greater in diameter than said sprocket 11 and includes, similarly to said first chain guard member 17, a chain guard portion 181 comprising an annular swollen portion 181a, an annular inclined portion 181b and a vertical portion 181c, and equally trisected fitting portions 182, 183 and 184 perforated with holes 182a, 183a and 184a, respectively.

Said holes 172a, 173a and 174a of the fitting portions 172, 173 and 174 formed on the first chain guard member 17 and said holes 111, 112 and 113 of the lower speed transmission sprocket 11 are so adapted as to be disposed respectively in alignment with said holes 121, 122 and 123 of the higher speed transmission sprocket 12, and said holes 182a, 183a and 184a of the fitting portions 182, 183 and 184 formed on the second chain guard member 18.

In order to dispose said higher speed and lower speed transmission sprockets 11, 12 in juxtaposed relation with one another and fixedly mount the first and second chain guard members 17, 18 on the outside of each of said sprockets 11, 12, the collars 131, 132 and 133 are interposed into said overlapped holes so as to be held at a regularly spaced apart interval between said sprockets 11 and 12; thereafter three shafts in common are inserted into these holes aligned with each other and fixedly tightened, for example, by means of tightening nuts 201, 202 and 203.

In other words, said shafts 191, 192 and 193 are respectively provided with shaft heads 191a, 192a and 193a and screw portions 191b, 192b and 193b with which said tightening nuts 201, 202 and 203 are screwably engaged.

Due to the arrangement of these screwably engaged nuts, said nuts, said chain guard members 17, 18 and said sprockets 11, 12 are fixedly mounted in alignment with each other to the crank 14 just as clearly shown in FIG. 2.

According to the above-mentioned multi-speed transmission front gear system of the present invention, a driving chain (not shown) can be exactly shifted for example from the lower speed transmission sprocket 11 onto the higher speed transmission sprocket 12 merely by operating a gearshift mounted at the outside of FIG. 2, because even if the chain is moved excessively by the operation of the gearshift or the gearshift is manipulated in a rude manner, the chain never fails to be brought into contact with the annular swollen portion 181a of of the chain guard portion 181 on the second chain guard member 18 and exactly prevented from getting off the sprocket 12 in spite of the fact that the chain is liable to run thereover and be caught into one side of the sprocket 12.

Furthermore, even in the event that the chain runs over the sprocket 12, the chain will ride on the annular inclined portion 181b of said chain guard portion 181 and be prevented from moving further to one side of the sprocket 12 because of the existence of the vertical portion 181c provided on the chain guard member 181.

In this case, the chain on the annular inclined portion 181b is automatically induced by means of said portion 181b to be brought into engagement with the sprocket 12.

Likewise, in the event that the chain is to be shifted from the highest speed transmission sprocket 12 onto the lower speed transmission sprocket 11, the first chain guard member 17 serves to exactly prevent the chain from getting off the sprocket 11.

Further even in the case that the chain runs over the sprocket 11, the chain is automatically brought into engagement with the sprocket 11 by means of the chain guard member 17.

The above-mentioned chain guard members 17 and 18 are adapted to rotate synchronously with the rotation of the sprockets 11, 12 and any other intermediate speed transmission sprockets mounted therebetween so that even if the chain is brought into contact with either of said chain guard members 17 and 18, there is caused no relative rotation nor consequent friction between the chain and the chain guard member with which the chain is in contact.

From the foregoing it will be clearly understood that according to the multi-speed transmission front gear system of the present invention, the chain can be completely prevented from getting off any selected one of the highest or lowest speed transmission sprockets constituting said gear system however violently or inexactly the shifting operation of the gearshift may be carried out, and that it is not necessary to provide on this gearshift an adjustable control means of any particular type that can adjust the range within which the chain can move, thus making it possible to produce a structurally much simplified gear-shifting system at the lowe cost of manufacture.

It is thought that the invention and many of its attendant advantages will be understood from the foregoing description, and it will be apparent that various changes and modifications may be made in the form, construction and arrangement of the parts without departing from the spirit and purview of the invention on sacrificing all of its material advantages, the form hereinbefore described being merely a preferred embodiment thereof.

What is claimed is:

1. A multi-speed transmission front gear system fixedly mounted to a crank shaft rotatable by the treading operation of foot-driven pedals and is provided with a plurality of sprockets each having a different number of dents thereon for transmitting the rotation of the crank shaft through a driving chain to a bicycle rear wheel, said plurality of sprockets including a lowest speed transmission sprocket having a minimum number of dents thereon and a highest speed transmission sprocket having a maximum number of dents thereon, said system comprising:

a first chain guard member having a diameter larger than that of the minimum number dent lowest speed transmission sprocket of said plurality of sprockets, said first chain guard member including a chain guard portion bent in opposed relationship to said lowest speed transmission sprocket, and fitting portions extended from said guard portion toward the center thereof and disposed at one side of said lowest speed transmission sprocket, a second chain guard member having a diameter larger than that of said maximum number dent highest speed transmission sprocket of said plurality of sprockets, said second chain guard member including a chain guard portion bent in opposed relationship to said highest speed transmission sprocket, and fitting means extended from said guard portion toward the center thereof and disposed at one side of said highest speed transmission sprocket, said first and said second chain guard members being disposed on opposite sides of said plurality of sprockets with said plurality of sprockets located between said first and second chain guard members, and fitting means for fitting each of said first and second chain guard members to one side of said highest and lowest speed transmission sprockets adjacent thereto through said fitting portions.

2. The multi-speed transmission front gear system, as set forth in claim 1, wherein said fitting means for fitting said first and second chain guard members to said lowest and highest speed transmission sprockets respectively, comprise holes perforated through the fitting portions of said first and second chain guard members and said lowest and highest speed transmission sprockets, said holes being disposed axially in alignment with each other, a single shaft means adapted to be inserted into said holes when they are disposed axially in alignment with each other, collar means adapted to be mounted onto said shaft means so as to keep the space between the lowest and highest speed transmission sprockets at a determined interval, and fixing means screwably engageable with the screwed portion of said shaft means so as to tightly fix said chain guard members to the lowest and highest speed transmission sprockets, respectively.

3. The multi-speed transmission front gear system, as set forth in claim 1, wherein the chain guard portions to be formed in the outer periphery of said first and second chain guard members comprise an annular portion swollen outwardly from said member to an extent not exceeding the width of chain links forming a driving chain engageable with one of said sprockets, an annular inclined portion at an obtuse angle therewith, and a vertical portion extended outwardly from the outer periphery of said annular inclined portion.

* * * * *

UNITED STATES PATENT OFFICE
CERTIFICATE OF CORRECTION

Patent No. 3,815,439               Dated June 11, 1974

Inventor(s) Satoshi Tarutani

It is certified that error appears in the above-identified patent and that said Letters Patent are hereby corrected as shown below:

In the heading of the patent, insert:

--[30]      Foreign Application Priority Data

November 16, 1971 Japan.................46/107680--.

Signed and sealed this 29th day of October 1974.

(SEAL)
Attest:

McCOY M. GIBSON JR.                C. MARSHALL DANN
Attesting Officer                  Commissioner of Patents